(12) United States Patent  (10) Patent No.: US 7,893,649 B2
Lamprecht  (45) Date of Patent: Feb. 22, 2011

(54) METHOD AND CIRCUIT ARRANGEMENT FOR DETERMINING THE ROTOR POSITION OF AN EC MOTOR IN THE STANDSTILL STATE

(75) Inventor: Dirk Lamprecht, Stuttgart-Rohr (DE)

(73) Assignee: Robert Bosch GmbH, Stuttgart (DE)

( * ) Notice: Subject to any disclaimer, the term of this patent is extended or adjusted under 35 U.S.C. 154(b) by 400 days.

(21) Appl. No.: 12/096,680

(22) PCT Filed: Nov. 30, 2006

(86) PCT No.: PCT/EP2006/069086

§ 371 (c)(1),
(2), (4) Date: Jun. 9, 2008

(87) PCT Pub. No.: WO2007/085312

PCT Pub. Date: Aug. 2, 2007

(65) Prior Publication Data

US 2008/0303516 A1  Dec. 11, 2008

(30) Foreign Application Priority Data

Jan. 30, 2006  (DE)  ........................ 10 2006 004 166

(51) Int. Cl.
*H02P 3/18* (2006.01)
(52) U.S. Cl. ................ 318/721; 318/778; 318/767; 318/727; 318/720; 318/722
(58) Field of Classification Search ................ 318/721, 318/778, 767, 727, 720, 722, 724
See application file for complete search history.

(56) References Cited

U.S. PATENT DOCUMENTS

| 5,028,852 A | | 7/1991 | Dunfield |
| 5,569,990 A | * | 10/1996 | Dunfield ................ 318/400.33 |
| 5,608,300 A | | 3/1997 | Kawabata et al. |
| 5,841,252 A | * | 11/1998 | Dunfield ................ 318/400.32 |
| 5,854,548 A | | 12/1998 | Taga et al. |
| 7,072,778 B2 | * | 7/2006 | Swanson ..................... 702/57 |

FOREIGN PATENT DOCUMENTS

| EP | 0 462 729 A2 | 12/1991 |
| EP | 0 793 337 A2 | 9/1997 |

* cited by examiner

*Primary Examiner*—Walter Benson
*Assistant Examiner*—David S Luo
(74) *Attorney, Agent, or Firm*—Ronald E. Greigg

(57) ABSTRACT

A method and circuit arrangement for determining position of the rotor of an electronically commutated motor, wherein the rotor has magnetic axes having different permeances. Voltage is applied to stator phases, and resultant phase currents are monitored for purpose of determining rotor position in the standstill state of the motor. First and second rise times of phase currents are determined until predetermined limit values are reached in unsaturated state. The assignment of a magnetic axis to a stator phase is determined from first rise times of the currents in unsaturated state of the rotor core, and the polarization of the rotor is determined from second rise times of currents upon energization with saturation effects. After run-up of the motor, initial energization of the stator can be determined comparing levels of the magnet wheel voltages and corrected by changing the commutation of stator energization.

20 Claims, 2 Drawing Sheets

METHOD AND CIRCUIT ARRANGEMENT FOR DETERMINING THE ROTOR POSITION OF AN EC MOTOR IN THE STANDSTILL STATE

CROSS-REFERENCE TO RELATED APPLICATION

This application is a 35 USC 371 application of PCT/EP 2006/069086 filed on Nov. 30, 2006.

BACKGROUND OF THE INVENTION

1. Field of the Invention

The invention relates to a method and circuit arrangement for determining the rotor position of an electronically commutated motor (EC motor). Methods of this kind, which are required for a controlled run-up of EC motors from the standstill state with maximum moment, are basically known. In this connection, the detection of the rotor position is carried out either with the aid of rotation angle sensors or alternatively without such sensors, through the use of magnetic machine effects.

2. Description of the Prior Art

For machines with a magnetically asymmetrical or symmetrical rotor, DE 101 62 380 A has disclosed determining the position of the rotor in the standstill state of the machine. In this instance, the measurement is carried out using saturation effects in the rotor iron so that over a full rotation of the rotor, the stator phases are acted on cyclically by a number of current pulses that corresponds to twice the number of stator phases, which pulses are respectively offset from one another by the same angle. The rise times of the current pulses, which occur in accordance with the degree of saturation of the respective rotor section are then used to determine the rotor position in the standstill state of the motor. Such a method requires a large number of powerful current pulses for the measurement, which causes unwanted magnetic noise, movements of the motor shaft, and a delay in the starting of the motor.

In addition, the prior art (German patent application 102 005 007 995.4) already includes the proposal of determining the position of the rotor of an EC motor in two successive steps in that in order to ascertain the position of the d-axis, the stator of an EC motor with a magnetically asymmetrical rotor is initially excited with current pulses that do not result in saturation effects in the rotor, and in this case, measuring the magnitude of the current that occurs. Then a stator phase that can be associated with the d-axis of the rotor is acted on with current pulses, which produce a saturation of the iron in the rotor, in order to determine the north/south orientation of the rotor. In both measurement procedures, the potential is measured on the one hand, at the winding star point of the stator and on the other hand, at a summation point of the phase voltages generated by means of resistances and is used as a criterion for the magnetic concatenation between the stator and the rotor of the motor. To this end, the winding star point of the stator must be led out and made accessible, thus limiting the usability of the motor. In addition, the detection of potentials increases the circuitry complexity of the arrangement since an analog/digital conversion is required in the control unit. Because of the required magnitude and duration of the individual phase current supplies, the current in the stator windings is reversed during the measuring procedure in order to achieve a quasi-stationary state of the rotor. This results in a relatively long measurement duration.

It is also known to determine the position of the rotor without the use of rotation angle sensors after the motor is started, based on the induced revolving field voltage in the respective unpowered phases. This method, however, only permits a reliable conclusion to be drawn about the rotor position after the motor has reached a certain minimum speed.

SUMMARY AND ADVANTAGES OF THE INVENTION

The object of the present invention is to permit a rotor position detection that is operationally reliable and can be implemented without high circuitry complexity, which, even when the motor is at a standstill, quickly supplies a rotor position signal with a low stator current and permits acceleration of the motor from a standstill with a maximum moment. This is achieved by the characterizing features of the invention while significantly reducing the noise in the machine and the movements of the shaft during the determination of the rotor position.

The supply of current to the stator advantageously occurs so that, in both the time measurement with the reluctance effect and in the time measurement with the saturation effect, the stator phases are triggered with voltage pulses of the same magnitude, preferably the magnitude of the operating voltage. Limiting the duration of the voltage pulses assures that the current pulses achieved in the stator phases have the same respective magnitude in both the measurement with the reluctance effect and the time measurement with the saturation effect. In the time measurement with the reluctance effect, the magnitude of the current pulses must be set so that no saturation occurs in the rotor iron, whereas in the time measurement with the saturation effect, the magnitude of the current pulses must be set so that saturation does in fact occur in the rotor iron. In this way, within a shortened time and with a reduced supply of current to the stator, in a first step using magnetic asymmetry, the d-axis of the rotor is determined as the axis with the lowest main inductance and, in a second step using saturation, the correct-polarity orientation of the rotor is determined by establishing the polarity with the lower main inductance in this measuring step and, in accordance with the rotor position determined, a starting current supply of the motor is established.

It has turned out to be very advantageous if, in an additional step after the starting of the motor, the voltages that the revolving field induces in the stator are also measured. This makes it possible for an initial current feed of the stator, which is unfavorable for a maximum possible moment progression and results from a possible boundary position of the rotor at the sector boundary of two stator phases, to be identified by comparing the levels of the revolving field voltages and corrected by changing the commutation of the stator current feed. This measurement is continued during the operation of the motor in order to continuously monitor the current feed pattern. The method according to the present invention can thus be embodied in a particularly advantageous fashion if on the one hand, during the start of the motor, a control unit for the stator current feed is controlled by means of a counter for determining and evaluating the rise times of the phase currents and on the other hand, after the start of the motor, the control unit is controlled by means of a component for detecting the currents induced in the unsupplied phases of the stator and this control unit, immediately after the start of the motor, checks the chronological evaluation of the phase currents and if need be, takes corrective intervention steps in the sequence control.

With regard to the embodiment of a circuit arrangement according to the present invention for determining the rotor position of an EC motor with a magnetically asymmetrical rotor, it is suitable if the input of a counter designated for determining the rise times of the phase currents is connected to the output of a differential amplifier whose inputs are contacted on the one hand, by a signal that corresponds to a limit value of the phase current and on the other hand, by a signal that corresponds to the magnitude of the respective phase current measured; the magnitude of the phase currents is preferably determined by means of a low-impedance resistor that is situated in the sum electric circuit of an inverter for the phase currents. Such a circuit arrangement can be implemented with a low degree of complexity for components and low costs, particularly through the use of an ASIC component for the sequence control unit. On the other hand, the use of a microcontroller as a control unit eliminates the need for including a separate counter and permits the direct software control of the inverter for the supply of current to the stator phases.

BRIEF DESCRIPTION OF THE DRAWINGS

Other details and advantageous embodiments of the present invention ensue from the claims and from the description of an exemplary embodiment when taken with the drawings, in which:

DESCRIPTION OF THE PREFERRED EMBODIMENT

Figure 1:
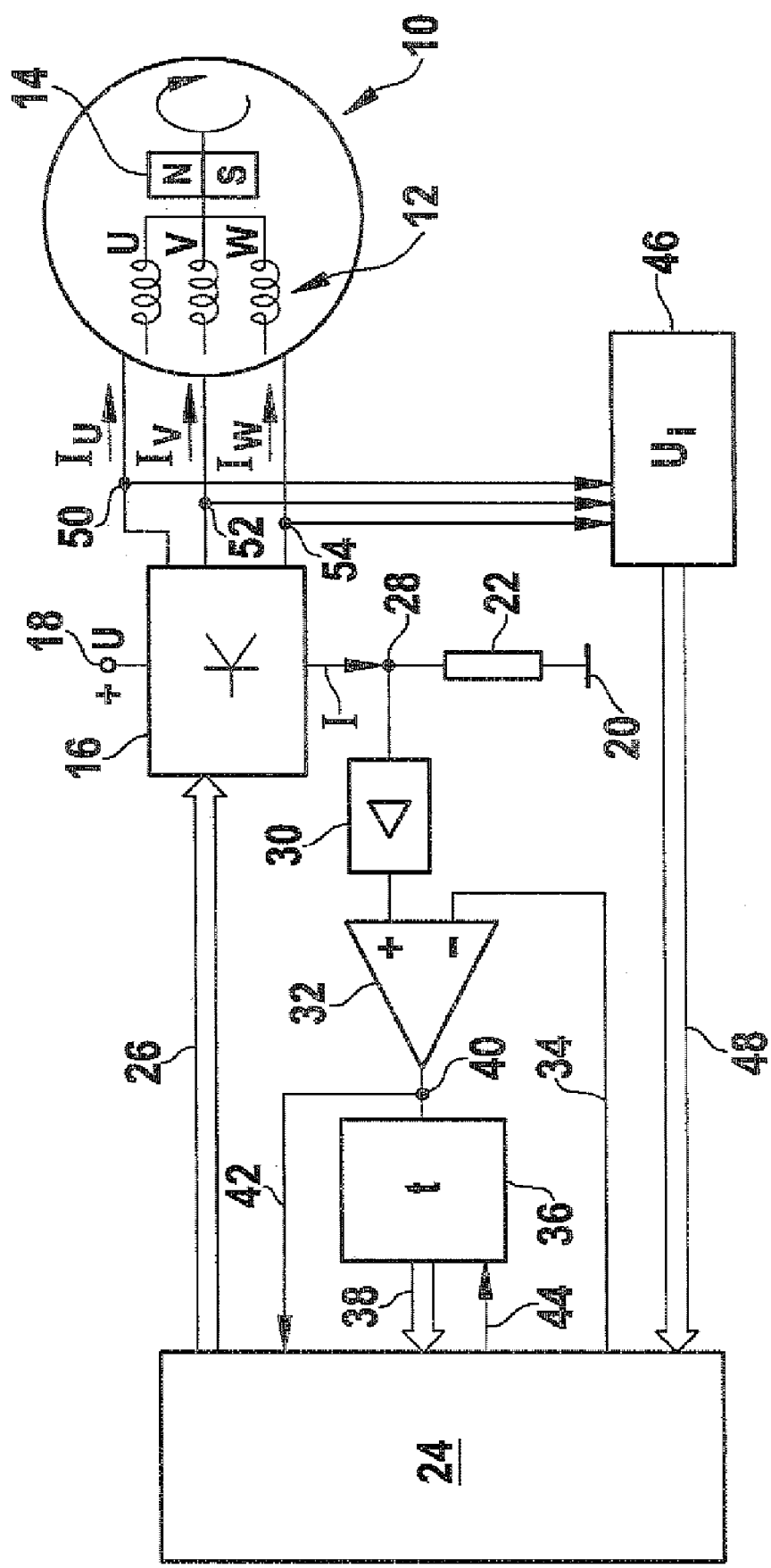
FIG. 1 shows a circuit arrangement for carrying out the method according to the present invention.

In FIG. 1, the reference numeral 10 denotes an EC motor (electronically commutated motor), having a three-phase stator 12 connected in a star, the stator phases U, V, W, and a four-pole, permanently excited rotor 14. The motor is supplied with current in a known way via an inverter 16 in a full bridge circuit, which on the one hand, is connected to the plus pole 18 of a d.c. voltage source U and on the other hand, is connected with its star point to a ground connection 20 via a shunt 22. A control unit 24, which in the known construction of the inverter 16 is likewise embodied as a six-poled arrangement with six semiconductor switches, controls the inverter 16 via a control line 26.

In accordance with the sum current I of the inverter 16, the voltage drop at the shunt 22 is picked up at the connection point 28 and is supplied via an amplifier 30 to the non-inverting input of a comparator 32. Via a line 34, the inverting input of this comparator is supplied with a limit value signal predetermined by the control unit 24 in accordance with a predetermined sum current limit value $I_{G1}$ or $I_{G2}$ according to FIG. 3. The output of the comparator 32 is connected to the input of a counter 36, which at its output, supplies a counting signal to the control unit 24 in accordance with the rise time of the motor sum current I up to the predetermined limit value $I_{G1}$, $I_{G2}$. The output signal of the comparator 32 is picked up at a connecting point 40 between the comparator 32 and a counter 36 and is supplied via a line 42 directly to the control unit 24 in order to reset the counter 36 once the respective limit values $I_{G1}$, $I_{G2}$ of the sum current I are reached. The starting of the counter 36 with the next current pulse according to FIG. 3 occurs by means of its supply line 44.

The circuit arrangement show in FIG. 1 is completed by means of a device 46 for rotor position determination through detection of voltages $U_i$ that the rotating rotor 14 induces in the unpowered phases U, V, W of the stator 12. To this end, the device 46 is connected to respective connections 50, 52, 54 of the phases U, V, W of the stator 12 and its output is connected to the control unit 24 via a line 48.

Figure 2:
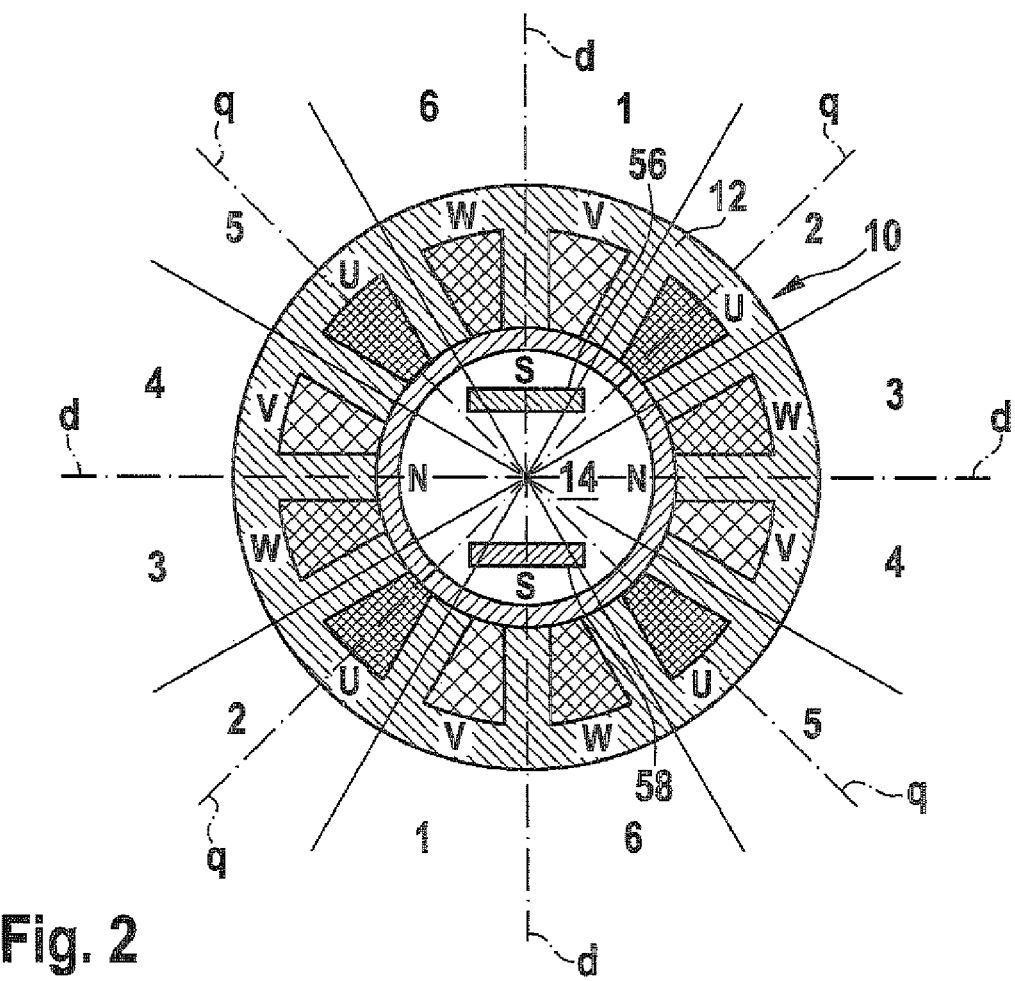
FIG. 2 shows a sectional depiction of the stator and rotor arrangement of a three-phase, four-pole EC motor.

FIG. 2 shows a section through the stator 12 and rotor 14 of a three-phase four-pole EC motor with a magnetically asymmetrical rotor 14. In synchronous operation, a 120° block current feed of the stator phases U, V, W necessitates a commutation every 60°, thus making it possible to divide an electric rotation into six sectors with a two-phase current supply. The sectors are labeled with the numerals 1 through 6, the magnetic axes of the rotor 14 are labeled d' and q', with the magnetization being produced by means of two magnet segments 56 and 58. The south pole of each of the magnet segments 56 and 58 is shown; the associated north poles are formed in the stator iron on a second horizontally extending d-axis. The design of the rotor 14 could, to the same effect, also be embodied with four magnet segments. The two q-axes each extend centrally between the d-axes.

Figure 3:
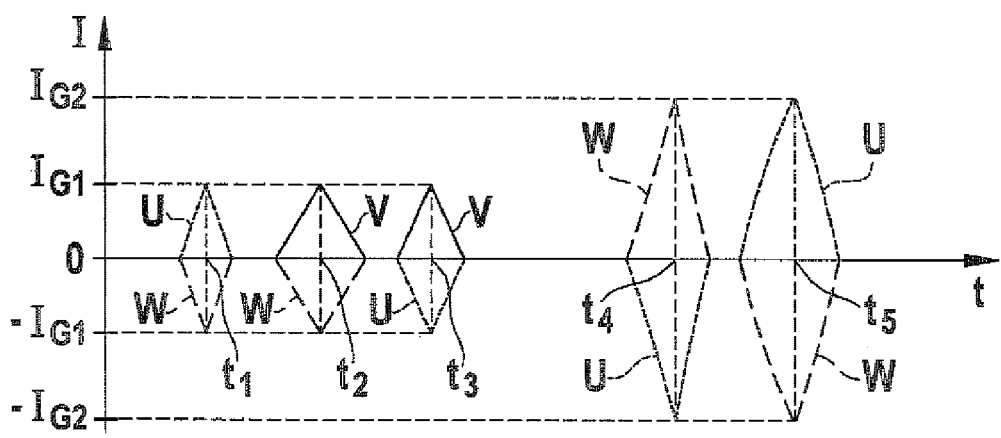
FIG. 3 is a schematic depiction of the measured phase currents, on the one hand in the unsaturated state of the rotor iron and on the other hand through the use of saturation effects.

On the left side, FIG. 3 shows the curve of the phase currents $I_U$, $I_V$, and $I_W$ in the standstill state of the machine in the unsaturated current supply range, each limited by the current $\pm I_{G1}$. In the saturated range, the current $\pm I_{G2}$ limits the phase currents at which the measurement in the unsaturated current supply range has yielded the shortest rise time. In the exemplary embodiment, these are the currents $I_U$ and $I_W$. In this case, via the inverter 16, the control unit 24 at first positively powers one of the three phases and negatively powers a second one, then first times t1, t2, t3 are measured from the beginning of the pulse to the reaching of the limit value $I_{G1}$, and the shortest of the three first times is established as a criterion for one of the sectors 1 through 3 and 4 through 6 in which the d-axis of the rotor 14 is presently situated. In this case, for the resulting flux vector, the following equations are true: in sector 1: $I_W=-I_U$, in sector 2: $I_W=-I_V$, and in sector 3: $I_V=-I_U$. At the end of the three measurements, the lowest counter value and the associated sector number are contained with the flux vector in the memory of the counter 36 and are furnished to the control unit 24 as a criterion 38 for the course of the d-axis. This determines the orientation of the d-axis of the rotor 14.

In a second measuring procedure, the two phases U and W with the shortest rise time $t_1$, from the first measurement are again inversely powered with a limit value $I_{G2}$ of the current raised to the saturation range; a rise time $t_4$ of the phases U−/W+, due to the lower saturation and the resulting shorter rise time $t_4$ of the current, is recognized as the correct phase position with regard to the north/south orientation of the d-axis. In accordance with this orientation of the rotor 14, the control unit 24 then establishes a sequence control with the corresponding current supply to the phases U, V, W by means of the inverter 16 and the motor can be started with a maximum moment.

A difficulty in making the determination in the starting position of the rotor 14 can arise if the rotor is situated in a boundary position between two sectors. Such a boundary position between two sectors can, for example, occur due to the detent moment of the EC motor or due to other influences. In this case, in order to correct an unfavorable initial current supply, in an additional step after the starting of the motor 10, the unfavorable initial current supply of the stator 12 resulting from a boundary position of the rotor 14 at the sector boundary of two stator phases can be identified by comparing the level of the revolving field currents and the stator current supply can be corrected by changing the commutation pattern. To this end, after the starting of the motor, the device 46 changes the current supply pattern originally established by the counter 36 based on the time measurements $t_1$, $t_2$, $t_3$, by detecting and evaluating the voltages $U_i$ induced in the unpowered phases of the stator. Furthermore, due to the continuous detection of these induced voltages during operation of the motor 10 as well, a rotor position signal is continuously supplied to the control unit 24 via the line 48, which signal then plays a dominant role in the determination of the current supply if the initial current supply has to be changed.

The method according to the present invention is consequently based on the advantageous combination of two or preferably three essentially known measuring methods. On the one hand, this constitutes the use of the reluctance effect due to the magnetic asymmetry of the rotor 14 with minimal main inductances in the region of the d-axes and maximal main inductances in the region of the q-axes of the rotor. On the other hand, the use of saturation effects in the iron and the higher supply of current to the rotor necessitated by this is only required for determining the correct-polarity north/south rotor position in the standstill state; the quicker current rise to the limit value $I_{G2}$, in the exemplary embodiment in the time t4, is detected with a positive powering of the phase V and a negative powering of the phase U. The quicker current rise in this instance is due to the more powerful saturation effect when the stator 12 and rotor 14 are situated opposite like poles.

By monitoring the revolving field current $U_i$ after the starting of the motor 10, the current supply pattern of the stator 12 can be tested in any operating state and corrected as needed. The noise and movements of the motor shaft, which are caused particularly with the use of saturation effects in the motor, are minimized by measuring with fewer and significantly weaker current pulses in the measurement method according to the present invention. With a shortened measurement duration, this achieves the acceleration of the motor with a maximum moment.

The circuitry complexity for the measurement is reduced to a low-impedance measuring resistor 22 for the sum current I of the inverter 16, an individual operational amplifier as the amplifier 30, a sum current comparator 32, a counter 36, and the control unit 24 as a finite state machine for the sequence control. This can be implemented either in the form of an ASIC or a microcontroller. When using a microcontroller as the control unit 24, the counter 36 is already contained in the microcontroller and the sequence control can be embodied in the form of software. The device 46 for determining the induced voltage is frequently already present in EC drive units that do not have rotation angle sensors so that it does not have any appreciable effect on the circuitry complexity.

The foregoing relates to the preferred exemplary embodiment of the invention, it being understood that other variants and embodiments thereof are possible within the spirit and scope of the invention, the latter being defined by the appended claims.

The invention claimed is:

1. A method for determining the rotor position of an electronically commutated motor equipped with a plurality of stator phases, whose rotor has magnetic axes with different magnetic permeances, comprising the steps of:
 applying voltage to the stator phases;
 monitoring resulting phase currents thereby determining the rotor position in a standstill state of the motor;
 measuring in a first procedure first and second rise times of the phase currents until predetermined limit values are reached in an unsaturated state, and in a second procedure through the use of saturation effects of the rotor iron and/or stator iron;
 determining an association of a magnetic axis to a stator phase based on the first rise times of the currents in the unsaturated state of the rotor iron; and
 determining polarity of the rotor based on the second rise times of the currents when current is supplied accompanied by saturation effects.

2. The method according to claim 1, wherein in each of the two measuring procedures, the stator phases are triggered with voltage pulses of equal magnitude, preferably with voltage pulses that correspond to the magnitude of the operating voltage.

3. The method according to claim 2, wherein in the first measurement procedure with a reluctance effect, the stator phases are triggered with voltage pulses below the saturation limit while in the second measurement procedure with the saturation effect, the current supply limit value is raised to a level above the saturation limit of the rotor iron.

4. The method according to claim 1, wherein in the first measurement procedure with a reluctance effect, the stator phases are triggered with voltage pulses below the saturation limit while in the second measurement procedure with the saturation effect, the current supply limit value is raised to a level above the saturation limit of the rotor iron.

5. The method according to claim 1, wherein in a first measurement step using magnetic asymmetry, the d-axis of the rotor is determined as the axis with the lowest main inductance and, in another step using saturation, the correct-polarity orientation of the rotor is determined by determining the polarity with the lower main inductance and, in accordance with the rotor position thus determined, a starting current supply of the motor is established.

6. The method according to claim 1, wherein in an additional step after starting of the motor, an initial current feed of the stator, which is unfavorable for a high moment progression and results from a boundary position of the rotor at a sector boundary of two stator phases, is determined by comparing revolving field voltages and is corrected by changing the commutation of the stator current feed in accordance with the levels of the revolving field voltages.

7. The method according to claim 6, wherein a device for detecting induced voltages after the starting of the motor checks a chronological evaluation of the phase currents and if need be, takes corrective measures in the sequence control.

8. The method according to claim 7, wherein a control unit for the supply of current to the stator at the starting of the rotor is controllable by a counter for determining and evaluating rise times of the phase currents and, after the starting of the rotor, is controllable by a device for detecting the voltages that the rotor induces in unpowered phases of the stator.

9. The method according to claim 6, wherein a control unit for the supply of current to the stator at the starting of the rotor is controllable by a counter for determining and evaluating rise times of the phase currents and, after the starting of the rotor, is controllable by a device for detecting the voltages that the rotor induces in unpowered phases of the stator.

10. A circuit arrangement for the starting control of an EC motor with a plurality of stator phases, whose rotor has magnetic axes with different magnetic permeances, in which the stator phases are acted on with voltage in alternation and resulting phase currents are monitored to determine the rotor position in a standstill state of the rotor, particularly in order to carry out the method according to claim 1, wherein a control unit of an inverter for commutation of the phase currents is controllable during starting of the motor by a counter whose counter setting is determined by rise times of the phase currents before reaching of a limit value.

11. The circuit arrangement according to claim 10, wherein an input of the counter is connected to an output of a comparator whose inputs on the one hand, are supplied with a signal for a limit value of the phase currents and on the other hand, are supplied with a signal that corresponds to the magnitude of the respective measured phase current.

12. The circuit arrangement according to claim 11, wherein the magnitude of the phase currents is determined by means of a low-impedance resistor situated in the sum current circuit of the inverter for the phase currents.

13. The circuit arrangement according to claim 11, wherein at its inputs, a device for determining the rotor position from the voltages induced in the unpowered phases of the stator is connected to connections of the stator windings and is connected to the control unit in parallel with the arrangement for determining rise times of the phase currents.

14. The circuit arrangement according to claim 11, wherein the control unit is embodied as a microcontroller and the counter is integrated into the control unit.

15. The circuit arrangement according to claim 10, wherein the magnitude of the phase currents is determined by means of a low-impedance resistor situated in the sum current circuit of the inverter for the phase currents.

16. The circuit arrangement according to claim 15, wherein at its inputs, a device for determining the rotor position from the voltages induced in the unpowered phases of the stator is connected to connections of the stator windings and is connected to the control unit in parallel with the arrangement for determining rise times of the phase currents.

17. The circuit arrangement according to claim 15, wherein the control unit is embodied as a microcontroller and the counter is integrated into the control unit.

18. The circuit arrangement according to claim 10, wherein at its inputs, a device for determining the rotor position from the voltages induced in the unpowered phases of the stator is connected to connections of the stator windings and is connected to the control unit in parallel with the arrangement for determining rise times of the phase currents.

19. The circuit arrangement according to claim 18, wherein the control unit is embodied as a microcontroller and the counter is integrated into the control unit.

20. The circuit arrangement according to claim 10, wherein the control unit is embodied as a microcontroller and the counter is integrated into the control unit.

* * * * *